United States Patent [19]

Soecknick et al.

[11] 4,190,473
[45] Feb. 26, 1980

[54] PROCESS FOR ACCELERATING THE HARDENING OF JOINTS GLUED WITH CRYSTALLINE HARDENING ADHESIVES

[75] Inventors: Erhard Soecknick, Düsseldorf; Erich Weimar, Viersen, both of Fed. Rep. of Germany

[73] Assignee: Messer Griesheim GmbH, Frankfurt am Main, Fed. Rep. of Germany

[21] Appl. No.: 862,361

[22] Filed: Dec. 20, 1977

[30] Foreign Application Priority Data

Dec. 30, 1976 [DE] Fed. Rep. of Germany ....... 2659502

[51] Int. Cl.² .............................................. B29C 25/00
[52] U.S. Cl. ......................................... 156/80; 264/28
[58] Field of Search ................. 156/80, 282, 305, 311, 156/320, 322, 334, 381, 498; 264/28, 237, 348

[56] References Cited

U.S. PATENT DOCUMENTS

| 891,428 | 6/1908 | Latus | 156/80 |
| 3,853,693 | 12/1974 | Priddle et al. | 156/334 |

FOREIGN PATENT DOCUMENTS

2256826 12/1975 France ........................................ 156/80

*Primary Examiner*—Caleb Weston
*Attorney, Agent, or Firm*—Connolly and Hutz

[57] ABSTRACT

Joints glued by crystalline hardening adhesives wherein the materials are adhesively coated and heated to drive off the thinner for being joined together have the hardening accelerated by a rapid cooling after being joined together.

4 Claims, 1 Drawing Figure

U.S. Patent  Feb. 26, 1980  4,190,473
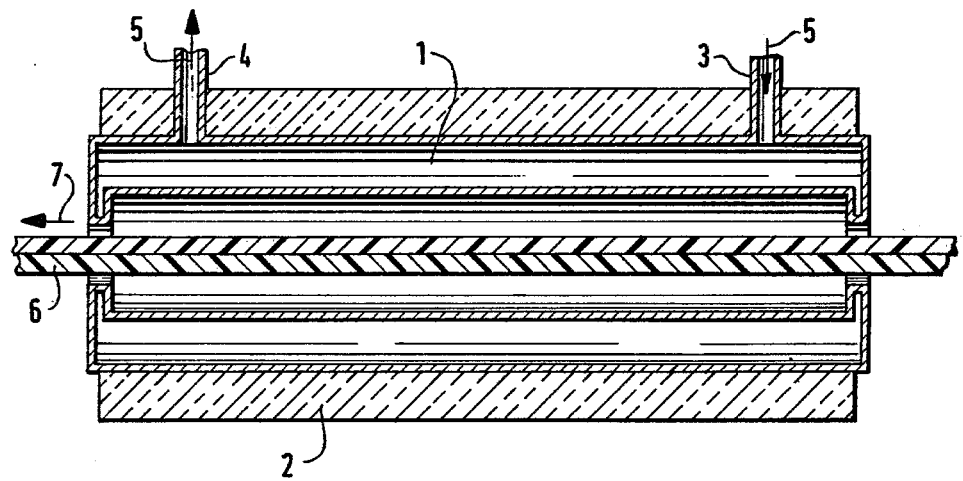

PROCESS FOR ACCELERATING THE HARDENING OF JOINTS GLUED WITH CRYSTALLINE HARDENING ADHESIVES

BACKGROUND OF THE INVENTION

The invention is concerned with a process for accelerating the hardening of joints glued with crystalline hardening adhesives, according to which the materials to be joined are coated with adhesive, heated for the purpose of driving off the thinner and joined together. Glued joints, for example, between leather, wood, metallic foils, plastic or synthetic rubber are produced in that the materials are coated with adhesive and pressed together.

One differentiates, thereby, between amorphous and crystalline hardening adhesives. The present invention is concerned only with crystalline hardening adhesive, for example, polyprene and neoprene.

Such adhesives are quite viscous and are therefore diluted with a thinner. After application of the adhesive, the thinner must be removed again before joining the materials together. This occurs because the thinner is driven out by heating the material which is coated with the adhesive to 100° C. Subsequently, the materials are glued together by pressing them together. As a result of prior heating, the initial adhesion of the glued joint is relatively small. It takes about 2 to 3 days until the adhesive is completely crystallized and maximum adhesion of the glued joint is attained.

The hardening is, however, often incomplete, so that even after several days, the required minimum adhesion is not attained. This is particularly the case with warm ambient temperatures, for example, on hot summer days, although not confined thereto. Such joints are unusable and represent thereby a considerable loss.

SUMMARY OF THE INVENTION

The object of the invention is to find a process which eliminates such losses and assures that the required adhesion is attained in each case.

A process for accelerating the hardening of joints glued with crystalline hardening adhesives, where the materials to be joined are coated with adhesive, heated in order to drive off the thinner, and brought together, was found by which according to the invention the glued joint is quickly cooled after it is assembled.

THE DRAWINGS

The single FIGURE illustrates in schematic form, a device for carrying out the inventive process, namely a cooling tube and a profile of synthetic rubber.

DETAILED DESCRIPTION

The rapid cooling of this invention advantageously is in a shockwise fashion by means of a low boiling liquified gas, for example, nitrogen. It is further advantageous if the liquified gas is not sprayed directly onto the joint, but rather that the heat transfer occur indirectly by having the joint pass through a tunnel cooled by the liquified gas. One hereby proceeds so that inside the entrance of the tunnel, a temperature of −30° to −50° C. is maintained.

The tunnel must be made so long that, taking into consideration the rate of advance, the glued joint is cooled by at least 8° C.

Since the rate of advance, is, as a rule, prescribed as, for example, in the preparation of glued profiles of plastic and synthetic rubber, the tunnel length for maintaining the temperature conditions depends then, essentially only on the geometry of the profile.

For the cooling of such glued profiles, as they are, for example, used as weatherstriping for automobile doors, a double walled, insulated tube can be used, in the cavity of which liquid nitrogen evaporates.

Other glued joints can, however, be prepared according to the inventive process, for example, laminated sheet metal. A tube as a tunnel is unsuited for this; the cross section of the tunnel must rather take the form of a wide slit.

As a result of the invention's shock cooling of the freshly glued joint, the crystalline hardening is enormously accelerated and in addition, assured in all cases that the crystalline hardening occurs in adequate measure so that the minimum required adhesion is attained in each case.

In the case of joints prepared according to the inventive process, the final adhesion is not obtained only after several days but rather is obtained after leaving the cooling device and rewarming to ambient temperature. The reject quota is thereby decisively reduced. As a result of the shock cooling, the crystal formation becomes so optimal that, as a matter of fact, a stronger adhesion is frequently attained than with the up to now customary process.

The single FIGURE schematically illustrates a device for carrying out the process. As illustrated therein, the device consists of a double walled tube which forms the jacket 1. The tube is surrounded by insulation 2. In the jacket 1, the liquid nitrogen evaporates, which enters or leaves the jacket 1 via the connecting pipes 3 and 4.

The direction of flow of the nitrogen is indicated by arrow 5. The profile 6 is fed through the device; the direction of feed being designated by the arrow 7.

According to a practical design for the preparation of a glued weatherstripping for automobile doors, the length of the cooling tube was 5 m. The temperature at the entrance of the cooling tube was −40° C. and at the exit was +6° C. The rate of adhesion, and therewith, the rate of feed was 16 m. per minute.

Adhesive strengths of between 95% and 100% of the ideal value were hereby attained for the breaking strength, while with the preparation of those without the invention's cooling, only about 75% of the ideal value was obtained.

What is claimed is:

1. In a process for accelerating the hardening and improving the strength of joints glued with crystalline hardening adhesives, according to which the materials to be joined are coated with an adhesive and heated for the purpose of driving off the thinner and joined together, the improvement being rapidly cooling the freshly glued heated joint after the materials are heated and joined together by means of a low boiling liquified gas by passing the glued joint through the passageway of a tunnel having a heat exchange jacket with a chilling medium inlet and outlet therefore and feeding the low boiling liquified gas into the inlet for obtaining a temperature of −30° C. to −50° C. at the tunnel entrance, and obtaining a final adhesion upon the joint leaving the device in which it is shockwise cooled and rewarmed to ambient temperature with the shockwise cooling accelerating the crystalline hardening and thereby maximizing the strength of the joint in a minimal time.

2. Process according to claim 1, chacterized by the fact that the glued joint is cooled by at least 8° C. when advanced through the tunnel.

3. Process according to claim 1, characterized by the fact that the cooling occurs by means of liquid nitorgen.

4. Process according to claim 3, characterized by the fact that the glued joint is cooled by at least 8° C. when advanced through the tunnel.

* * * * *